Figure 1:
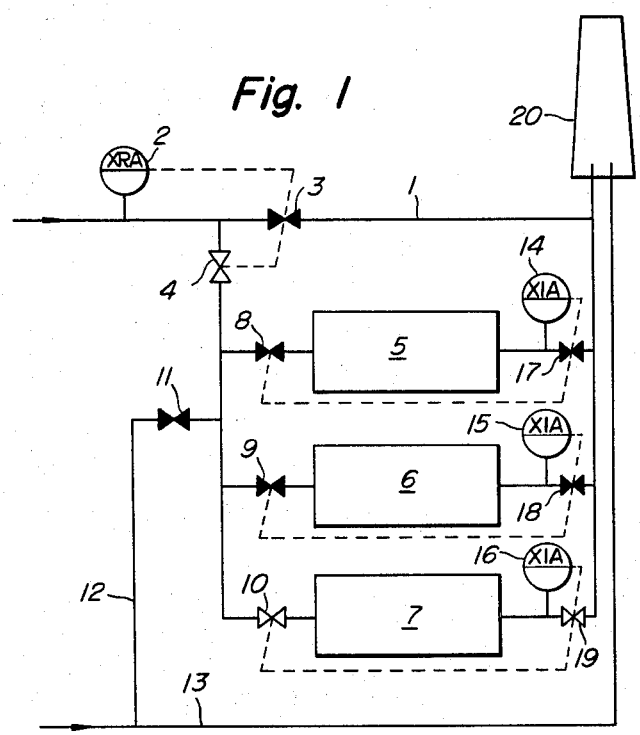

Sept. 10, 1968  HAJIME YAMANOUCHI  3,400,511

APPARATUS AND METHOD FOR RETAINING RADIOACTIVE EXAUST GAS

Original Filed Dec. 24, 1963

INVENTOR
HAJIME YAMANOUCHI

BY *Paul M. Craig, Jr.*

ATTORNEY

United States Patent Office 3,400,511
Patented Sept. 10, 1968

3,400,511
APPARATUS AND METHOD FOR RETAINING
RADIOACTIVE EXHAUST GAS
Hajime Yamanouchi, Hitachi-shi, Japan, assignor to
Hitachi, Ltd., Osaka, Japan, a corporation of Japan
Continuation of application Ser. No. 333,053, Dec. 24,
1963. This application Aug. 3, 1966, Ser. No. 573,750
Claims priority, application Japan, Dec. 28, 1962,
37/59,169
8 Claims. (Cl. 55—18)

This is a continuation of application Ser. No. 333,053, filed Dec. 24, 1963, in the United States Patent Office, and now abandoned.

This invention relates to an apparatus and method for temporarily retaining exhaust gas produced in a nuclear reactor when the radioactivity of the same rises above a predetermined value.

Present nuclear reactors produce various radioactive gases. For example, in a water-moderated and water cooled reactor, $N^{16}$, $A^{41}$, $O^{19}$, $N^{13}$, $N^{17}$ and the like are produced by neutron irradiation in addition to decomposed gaseous water. Moreover, there is some possibility that gaseous fission products such as Kr and Xe may be emitted from uranium attached to the surfaces of the fuel rods or discharged upon rupture of claddings of the fuel rods.

These radioactive gases are difficult to treat as compared with other liquid or solid radioactive wastes and are generally discharged into the atmosphere through a stack.

Radioactive exhaust gases are produced in large quantities in atomic power plants of high power output. The normal annual radiation dose on the plant site due to radioactive gases discharged from the exhaust funnel is usually very low, but it may be reasonably expected that large quantities of radioactive gases may be discharged from the stack as a result of accidents, such as rupture of the claddings, the fuel rods and the like. Furthermore, with an experimental reactor using a nutron flux of high intensity, the allowable discharge rate may be temporarily exceeded even though the average annual discharge rate usually remains well below the allowable limit since exhaust gases of a very high radioactive level can be produced in certain experiments.

As the exhaust gas discharged from the stack may contain a considerable amount of radioactivity, the resident community surrounding the reactor could be subject to a radioactive hazard because of the radioactive exhaust gas during unfavorable atmospheric conditions. Accordingly, it is desirable to retain this exhaust gas, which is temporarily formed under unfavorable conditions, before its discharge from the stack.

In the prior art, however, it has been impossible to retain positively the fission product gases.

It is, therefore, an object of the present invention to provide an apparatus and method for positively retaining fission product gases contained in the exhaust gas discharged from a nuclear reactor and for discharging the exhaust gas when atmospheric conditions are favorable therefor.

According to the present invention, an apparatus for retaining radioactive exhaust gases comprises two or more reservoirs for retaining the exhaust, each having an adsorbing medium disposed therewithin and provided additionally with a device for regenerating the adsorbing medium, said reservoirs being arranged in parallel relation to a system from the reactor to a stack for discharging the exhaust gas from the nuclear reactor, another tubing for supplying air for diluting the exhaust gas contained within the reservoirs from a different system than the last mentioned system and a detecting device disposed in an upstream position in the system from the reactor to the stack for monitoring the radioactivity of the exhaust gas, thereby the exhaust gas being retained temporarily by passing it through any of said reservoirs and being discharged after a suitable time interval.

Figure 2:
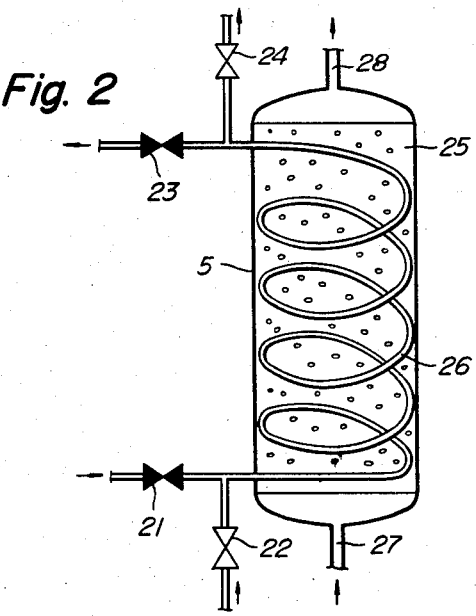

These and other objects and advantages of the invention will be made more apparent from the following description taken in reference to the accompanying drawing which shows a preferred embodiment thereof and in which:

FIGURE 1 shows a schematic diagram of an apparatus for retaining the exhaust gas embodying the present invention; and FIGURE 2 shows a cross-sectional detailed view of the reservoir for retaining the exhaust gas of the apparatus shown in FIGURE 1.

Referring to FIGURE 1, which illustrates an embodiment according to the present invention having three reservoirs 5, 6 and 7 arranged in parallel relation to each other for positively retaining radioactive exhaust gases, the exhaust gas is delivered to a stack 20 through a tubing 1 leading from a nuclear reactor (not shown). A device 2 for monitoring the radioactivity of the exhaust gas which has been treated in a treating system and a valve means 3 are disposed up- and downstream of the tubing 1, respectively.

The reservoirs 5, 6 and 7 are disposed in parallel relation to the tubing 1 and each of the reservoirs is provided with valves at opposite ends. Monitoring devices 14, 15 and 16 for monitoring radioactivity downstream from the reservoirs are arranged on the discharging sides of the reservoirs 5, 6 and 7, respectively. Each of the reservoirs 5, 6 and 7 is provided therewithin with a tube 26 of helical form and an adsorbing medium 25 surrounding the tube 26 for adsorbing the exhaust gas.

After being monitored by means of the radioactivity monitoring device 2, the exhaust gas which has been treated in a system for treating the exhaust gas is discharged into atmospheric air through the stack 20 when the valve 3 is opened in response to a signal of low radioactivity from the monitoring device 2.

The valves 3 and 4 are arranged with respect to the monitoring device 2 so that the valve 4 is closed when the valve 3 is opened in response to the signal from the monitoring device 2. When the exhaust gas flowing from the treating system is of a high radioactive level, the valve 3 is closed and at once the valve 4 is opened in response to a signal from the monitoring device 2. Then the exhaust gas passes through the valve 4 into the reservoir 5. Since the reservoir is provided therewithin with a gas adsorbing medium 25, gas of high radioactivity is adsorbed and air of low radioactivity and $N_2$ are discharged out of the reservoir 5.

Treating capacity of the adsorbing medium disposed within each of the reservoirs is limited. Accordingly, when the absorbing capacity of one of the reservoirs has been fully utilized, another reservoir may be substituted for it. Thus, when the exhaust gas exceeding the adsorbing capacity of the reservoir 5 is delivered into the reservoir 5, the monitoring device 14 senses a high radioactive level and the valves 8 and 17 are closed in response to a signal from the monitoring device 14 to cause the exhaust gas to flow into another reservoir 6 by means of valve 9 which is then actuated to an open position. The same type of operation applies to reservoir 6, as when monitoring device 15 senses a high radioactive level, valves 9 and 18 are closed and the radioactive exhaust gas allowed to flow into reservoir 7 through valve 10. Although gases of a high radioactivity level may be adsorbed by repetition of this sequence, when the radioactive level of the exhaust gas delivered from the treating system is lowered below a predetermined value, the valves 3 and 4 are reset in response to a signal from the monitoring device 2 to discharge the exhaust gas through the stack 20 without passing through the reservoirs 5, 6 or 7. The radioactive exhaust gas stored in the reservoirs 5, 6 and 7 may be discharged into atmospheric air by heating the adsorbing medium 25 to expel the radioactive gas and diluting the thus expelled gas with ventilating air supplied through a piping 12 by opening the valves 11, 8 and 17 under favorable atmospheric conditions or during the rest time of the reactor. For this purpose, the helical tube 26 is arranged within each of the reservoirs 5, 6 and 7. When adsorption by means of the medium 25 is required its adsorption effect is promoted by cooling it by causing cold water to flow through the helical tube 26 by opening valves 22 and 24. On the contrary, when expelling of gas is to be effected, the adsorbing medium 25 may be heated by causing hot steam or water to flow through the tube 26 by closing valves 22 and 24 and opening valves 21 and 23. Thus, the exhaust gas which has been adsorbed in the adsorbing medium 25 is expelled therefrom by heating the medium 25, and it is discharged through the stack 20.

As described above, by provision of a retaining system and reservoirs for retaining the exhaust gas, a high radioactive dose is prevented from being discharged around the reactor and it is not necessary to suspend the operation of the reactor if highly radioactive gases (for example, large amounts of $A^{41}$, Kr, Xe and the like) should be included in the exhaust gas therefrom from any cause.

Since gases of short half-life such as $N^{16}$ which is normally contained in the exhaust gas, does disintegrate within the reservoirs, the apparatus according to the invention is effective even when the radioactive level of the exhaust gas is raised by the inclusion of the gases of short half-life. Moreover, people in the vicinity of the reactor are protected from radioactive hazards as the exhaust gas can be discharged into the atmosphere as desired during favorable atmospheric conditions.

It is possible to operate efficiently the adsorbing media disposed within the reservoirs by cooling and heating suitably to promote the adsorbing and expelling action thereof. Any of the adsorbing media known in the art for the purposes herein may be utilized in reservoirs 5, 6 and 7. This invention is directed to a novel apparatus for retaining radioactive exhaust gas and is not directed or to be limited to any specific adsorbing medium. Furthermore, the medium for adsorbing the exhaust gas may be simply and automatically regenerated as the gas adsorbed by the adsorbing medium can be expelled therefrom so that the medium is made ready for another adsorbing operation.

The invention being thus described, it will be obvious that the same may be varied in many ways. Such variations are not to be regarded as a departure from the spirit and scope of the invention, and all such modifications are intended to be included within the scope of the following claims.

I claim:
1. A process for treating an exhaust gas containing radioactive gases which comprises selectively directing an exhaust gas low in radioactivity directly to the atmosphere and an exhaust gas high in radioactivity to the first of a series of adsorption reservoirs substantially removing the radioactive gases from the exhaust gas in said first adsorption reservoir, discharging said treated exhaust gas to the atmosphere, monitoring said discharged gas such that when the radioactivity of said gas reaches a predetermined level the first adsorption reservoir is bypassed and the exhaust gas containing radioactive gases is directed to a second reservoir and succeeding reservoirs as the adsorbing capacity of each reservoir is in turn spent.

2. The process of claim 1 wherein the exhaust gas containing radioactive gases is retained in the first adsorption reservoir and when the monitoring device on the discharge side of said first adsorption reservoir senses a high radioactive level the exhaust gas containing radioactive gases is caused to flow into a second adsorption reservor in parallel relationship with said first adsorption reservoir.

3. The process of claim 2 wherein the radioactive gases retained in the adsorption reservoirs are discharged into the atmosphere by heating the adsorbing medium in said adsorption reservoirs to expel the radioactive gases and diluting the expelled gases with ventilating air.

4. The process of claim 1 wherein the radioactive gases retained in the adsorption reservoirs are discharged into the atmosphere by heating the adsorbing medium in said adsorption reservoirs to expel the radioactive gases and diluting the expelled gases with ventilating air.

5. An apparatus for treating an exhaust gas containing radioactive gases which comprises means for selectively directing an exhaust gas low in radioactivity directly to the atmosphere and an exhaust gas high in radioactivity to a first adsorption means, an adsorbing medium disposed within said first adsorption means for recovering and retaining radioactive gases, valve means positioned upstream and downstream of said first adsorption means responsive to a monitoring means positioned downstream of said first adsorption means, means for by-passing said first adsorption means and directing the exhaust gas containing radioactive gases directly to a second adsorption means, means for supplying air to said adsorption means subsequent to adsorption to dilute said radioactive gases and means for expelling the diluted radioactive gases from said adsorption means through exhaust means directly to the atmosphere.

6. The apparatus of claim 5 wherein a heat exchange means is disposed within said adsorption means for facilitating adsorption and removal of the radioactive gases.

7. The apparatus of claim 5 wherein a plurality of adsorption means are disposed in parallel relationship to each other.

8. A process for discharging an exhaust gas containing radioactive gases produced in a nuclear reactor which comprises monitoring the exhaust gas and selectively directing said exhaust gas to the atmosphere when it is low in radioactivity and to the first of a series of adsorption reservoirs when it is high in radioactivity, each of the reservoirs being provided with an adsorbing medium capable of adsorbing that portion of the exhaust gas which is high in radioactivity, monitoring the discharged portion of the exhaust gas from the first of said reservoirs which has not been adsorbed by the absorbing medium, discharging said gas to the atmosphere when it is low in radioactivity, directing the gas to the second of said reservoirs and succeeding reservoirs when it is high in radioactivity due to the exhausting of the adsorbing capacity of the first of said reservoirs and in turn the succeeding reservoirs and discharging the adsorbed gas in said reservoirs to the atmosphere when the weather conditions become suitable for said discharging.

References Cited

UNITED STATES PATENTS

| 1,892,428 | 12/1932 | Fonda | 55—19 |
|---|---|---|---|
| 2,703,628 | 3/1955 | Pompeo et al. | 55—179 X |
| 3,002,583 | 10/1961 | Findlay | 55—19 |
| 3,093,564 | 6/1963 | Weisman et al. | 204—193.2 |
| 3,197,377 | 7/1965 | Ohlinger | 176—19 |
| 3,257,314 | 6/1966 | Kitchen | 210—30 |
| 3,257,772 | 6/1966 | Maddox et al. | 55—180 |

REUBEN FRIEDMAN, *Primary Examiner.*

R. W. BURKS, *Assistant Examiner.*